Jan. 20, 1925.

D. H. HUNTER 1,523,967

INSECT DESTROYING MACHINE

Filed Feb. 6, 1924     4 Sheets-Sheet 3

Inventor;
David H. Hunter
By Louis Baggler
his Attys

Jan. 20, 1925. 1,523,967

D. H. HUNTER

INSECT DESTROYING MACHINE

Filed Feb. 6, 1924 4 Sheets-Sheet 4

Patented Jan. 20, 1925.

1,523,967

UNITED STATES PATENT OFFICE.

DAVID HENRY HUNTER, OF LAGRANGE, GEORGIA.

INSECT-DESTROYING MACHINE.

Application filed February 6, 1924. Serial No. 690,961.

*To all whom it may concern:*

Be it known that I, DAVID HENRY HUNTER, a citizen of the United States, residing at Lagrange, in the county of Troup and State of Georgia, have invented certain new and useful Improvements in Insect-Destroying Machines, of which the following is a specification.

This invention relates to a machine for removing insects from plants and absolutely destroying them by fire without injury to the plants.

The object of the invention is to produce a combined insect exterminator and sprayer which is adapted to travel over the field between the rows and shake off the insects into a trough on either side of the machine whereupon they descend to a furnace where they are consumed. Simultaneously, a sprayer arrangement at the rear of the machine is brought into action for spraying plants.

Figure 1:
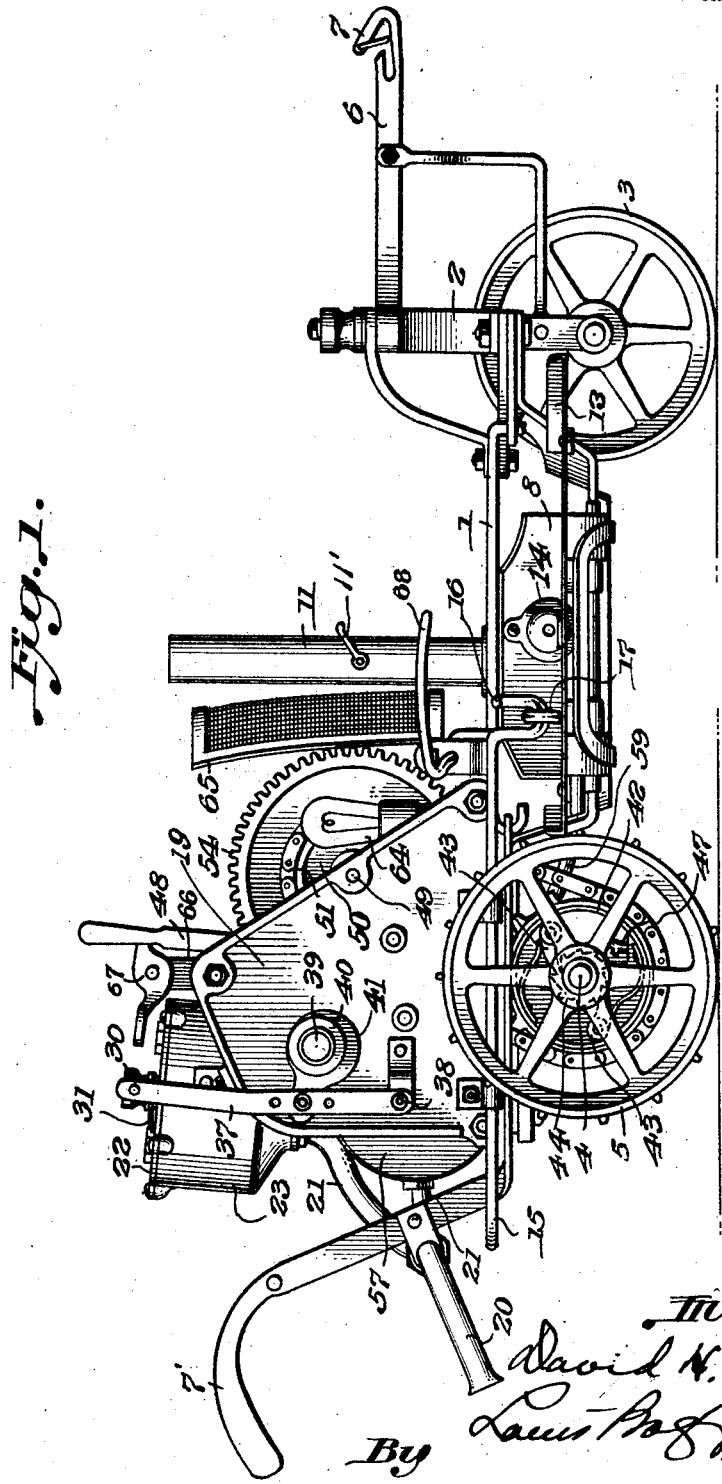
Figure 1 is a side elevation of the machine.
Figure 2:
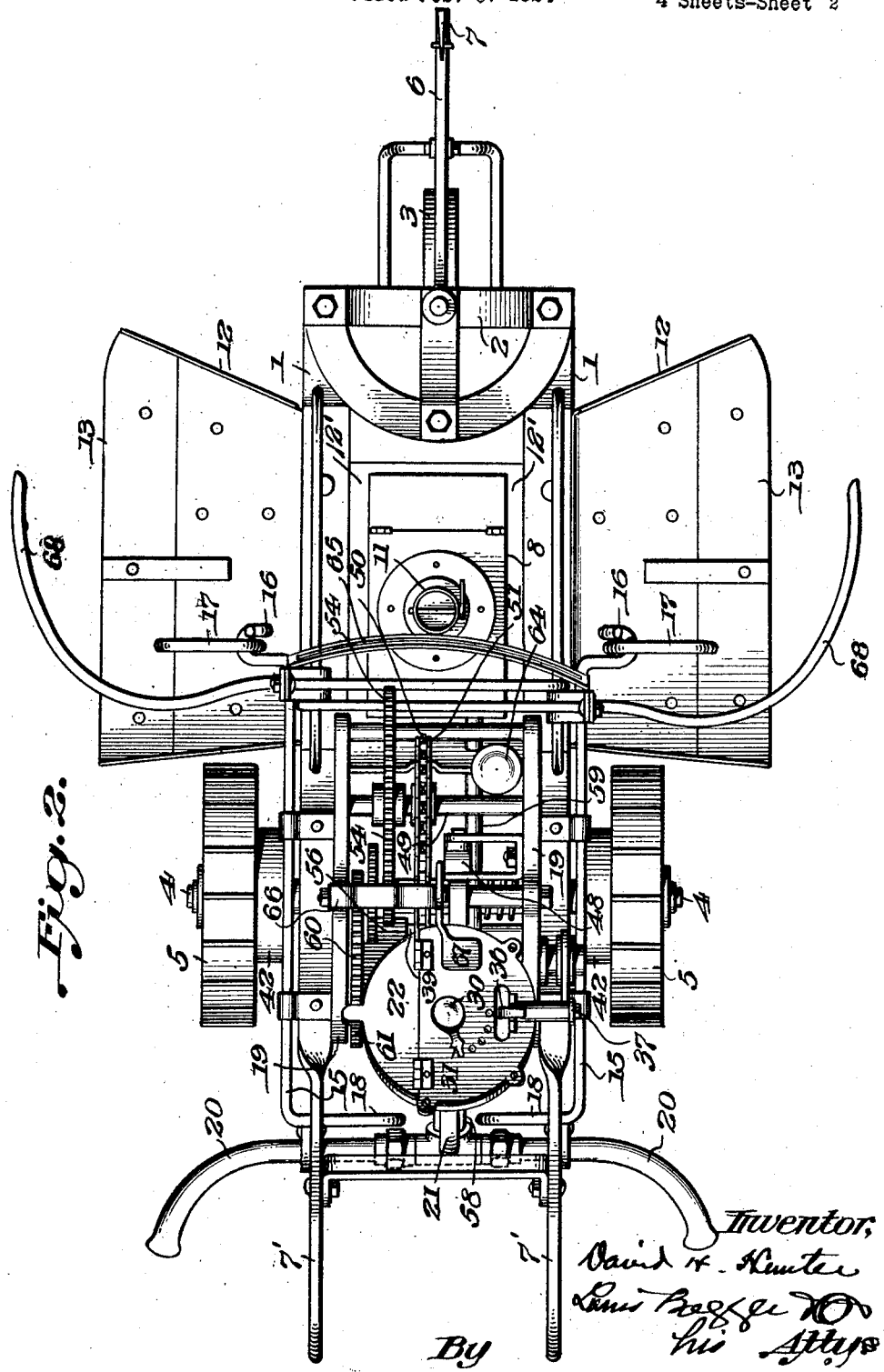
Figure 2 is a top plan view thereof.
Figure 3:
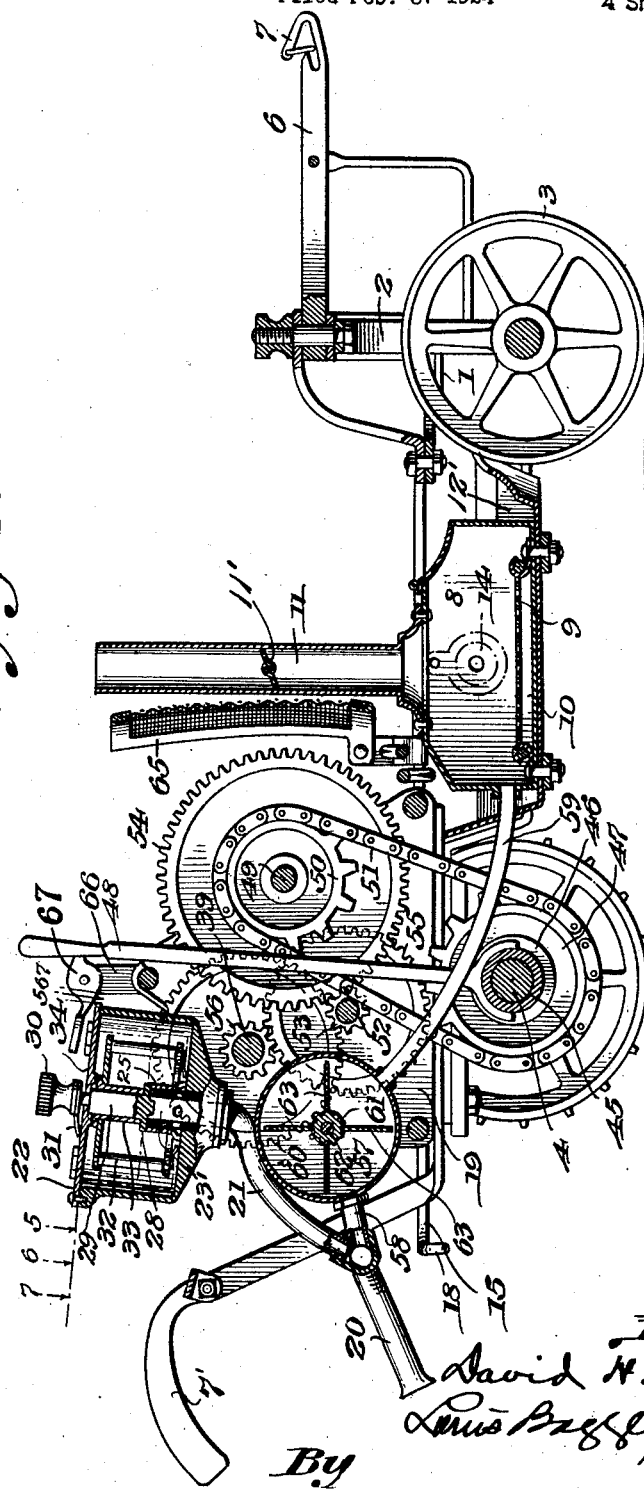
Figure 3 is a longitudinally vertical section of the machine.
Figure 4:
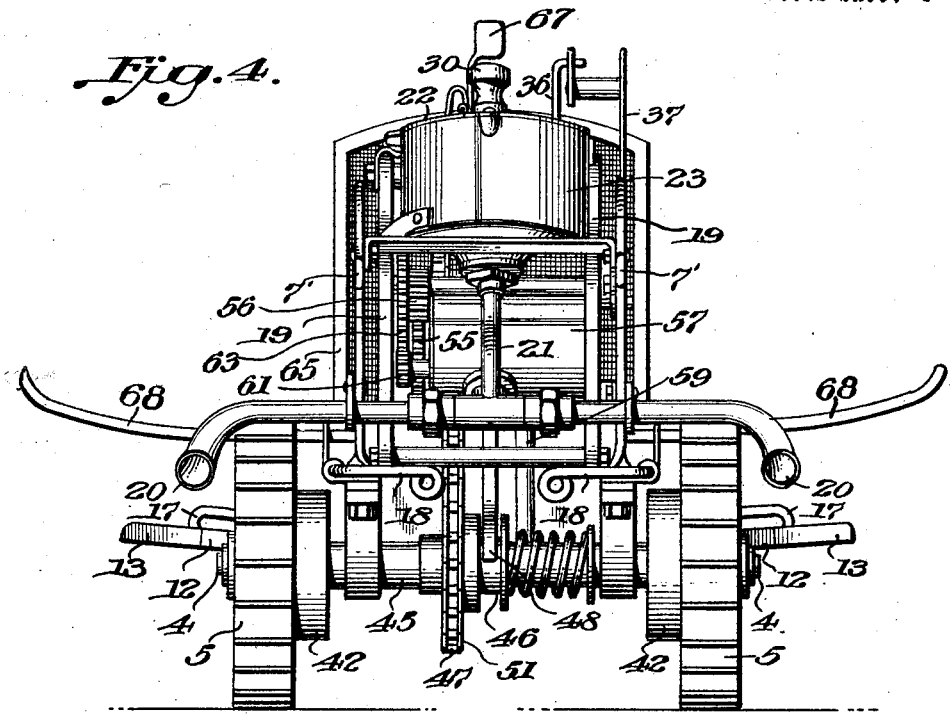
Figure 4 is a rear view of the machine.
Figure 5:
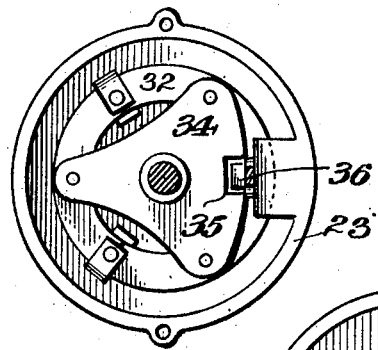
Figure 5 is a transverse horizontal section through the spray tank on line 5—5 of Figure 3.
Figure 6:
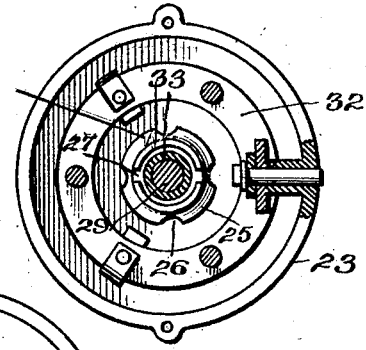
Figure 6 is a transverse horizontal section of the spray tank on line 6—6 of Figure 3.
Figure 7:
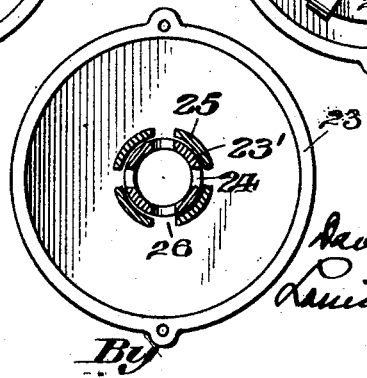
Figure 7 is a transverse horizontal section on line 7—7 of Figure 3.

The numeral 1 indicates the frame of the vehicle having pivoted to the front end thereof a fork wheel frame 2 which carries the front wheel 3. Supported at the rear of the frame is the rear axle 4 upon which are mounted the traction wheels 5—5. Extending forwardly from the front of the machine is a tongue 6 provided at its outer end with a hook 7 by which power is applied for moving the machine. Extending rearwardly from the main frame are the handles 7'—7' which permits the operator to steer the machine independently of the pulling means. Arranged centrally of the main frame is a furnace consisting of an upper chamber 8 with the usual grate 9 and a lower ash chamber 10. The upper chamber 8 is entirely enclosed and is provided with valved fresh air inlets 14 and projecting vertically therefrom is a draft chimney 11 having the usual damper 11'. Extending laterally from either side of the machine are the chutes 12—12 which communicate with the troughs 12' located around the base of the furnace. Detachably secured to the outer ends of the chutes 12 are auxiliary chutes 13—13 which accommodate the machine to different widths of rows of plants. These chutes converge toward the furnace and communicate with troughs around the furnace, where the insects are consumed. Arranged above the chutes 12—12 and extending laterally from the machine are a pair of curved arms 68, which serve to shake the plant and cause the insects to be deposited upon the trough 12—12.

As a means for the vertical adjustment of the chutes 12—12, I preferably provide longitudinally arranged rotatable lock shafts 15—15, their inner ends bent into the form of hooks 16—16 adapted to engage with straps 17—17 secured to the chutes 12—12 while their outer ends are bent to form handles 18—18.

Arranged at the rear of the machine is a sub-frame consisting of two vertical side walls 19—19.

Arranged transversely at the rear of the machine are the spraying nozzles 20—20. These nozzles are connected by a pipe 21 to a sprayer tank 23 interposed between the side walls and supported thereupon. It is desirable to agitate the solution in the spray tank, and for this purpose I preferably provide the following mechanism:

Extending vertically from the center of the tank is a hollow tube 23' having radial openings 24. Surrounding this tube is a sleeve 25 having openings 26 at the bottom which are adapted to register with the openings 24 as the sleeve is oscillated. The upper end of the sleeve is provided with notches 27 adapted to receive the projections from the disk 28 carried at the bottom of the downwardly projecting stud 29. The upper end of the stud is provided with a knurled nut 30 and an indicating hand 31 visible from the top of the tank whereby the adjustment of the sleeve 25 with relation to the outlet of the tank may be observed. It is desirable to continually agitate the solution in the tank, and for this purpose I provide an oscillating spider 32 with a central sleeve 33 rotatably journaled on the stud 29. The upper member 34 of this spider is provided with a notch 35 adapted to receive a lever 36 pivoted to the side wall of the tank. The upper end of this lever engages the upper end of an oscillating arm 37 pivoted as at 38 to one of the side walls 19. Extending transversely of the machine is a jack-shaft 39 carrying on its outer end a cam 40 which receives a cam strap 41, one end of which is connected to the oscillating arm 37. This jack shaft is preferably rotated by means of the following driving mechanism:

Fixed to the shaft 4 adjacent to each traction wheel 5 is a drum 42 carrying spring-pressed pawls 43 which are adapted to engage a ratchet wheel 44 carried by each wheel. These drums are integral with a hollow casing 45 extending transversely of the shaft 4, and slidably keyed upon this casing 45 is a clutch member 46 which is adapted to engage a sprocket wheel 47 rotatably mounted upon the casing 45. A clutch lever 48 pivotally mounted to the side wall is provided for the disengagement of the clutch and sprocket wheel. Pivoted transversely of the upper frame is a jack shaft 49 carrying a sprocket wheel 50, said sprocket wheels 47 and 50 being connected together by suitable sprocket chain 51. Mounted intermediate of the jack shafts 49 and 39 is a jack shaft 52 carrying a pinion 53 which engages with a gear 54 rotatably mounted on the shaft 49 and integral with the sprocket wheel 50. The pinion 53 is integral with a gear 55 which meshes with a gear 56 keyed to the shaft 39, this driving mechanism imparting an oscillatory movement to the agitator within the spray tank by means of the oscillation of the pivoted lever 37. Extending transversely of the side members 19—19 is a bracket 66, to which is pivoted for vertical movement a latch 67, arranged in the path of the lever 48, the latch acting to retain the lever in either of its extreme positions.

The numeral 57 indicates a blower mounted beneath the spray tank connected by a pipe 58 to the spray nozzles at such a point as to cause a suction upon the spray tank as the blower is in operation, serving to force the liquid through the nozzles. This blower is likewise connected by a pipe 59 to the furnace, producing a forced draft to intensify the heat. This blower is rotated by means of a gear 60 keyed to the shaft 39, and a pinion 61 is carried upon the blower shaft 62 which carries the blades 63 of the blower.

As means for night use of the machine, I preferably mount upon the machine a light 64 arranged back of a screen 65 immediately above the furnace, the object being to attract the insects where they will be caught by the machine and dropped down around the furnace and be consumed.

I claim:

1. In an insect exterminator, a wheeled frame, an insect destroying apparatus comprising a furnace, troughs around the furnace, chutes extending laterally from the wheeled frame and communicating with the troughs around the furnace.

2. In an insect exterminator, a wheeled frame, an insect destroying apparatus comprising a furnace, troughs around the furnace, chutes extending laterally from the wheeled frame and communicating with the troughs around the furnace, and a blower connected to said furnace and means for actuating the same.

3. In an insect exterminator, a wheeled frame, an insect destroying apparatus comprising a furnace, troughs around said furnace, chutes extending laterally from the wheeled frame and communicating with the troughs around said furnace, spraying nozzles arranged at the rear of the machine, a supply tank for said nozzles, and a blower for forcing the liquid from the tank to the sprayers.

4. In an insect exterminator, a wheeled frame, an insect destroying apparatus comprising a furnace, troughs around said furnace, chutes extending laterally from the wheeled frame and communicating with the troughs around the furnace, spraying nozzles arranged at the rear of the machine, a supply tank for said nozzles, a blower for forcing the liquid from the tank to the sprayers, and a pipe communicating with said blower and the furnace for maintaining a forced draft in said furnace.

5. In an insect exterminator, a wheeled frame, an insect destroying apparatus comprising a furnace, troughs around said furnace, chutes extending laterally from the wheeled frame and communicating with the troughs around the furnace, a blower connected to said furnace, means for actuating the same, a pipe communicating with said blower, and spraying nozzles for forcing the spray laterally from the nozzles.

6. In an insect exterminator, a wheeled frame and an insect destroying apparatus comprising a furnace arranged at the forward end of said frame, annular troughs arranged around the base of said furnace, pivoted chutes extending laterally from the wheeled frame and communicating with the said troughs, means for a vertical adjustment of said chutes, spraying nozzles arranged transversely and at the rear of said frame, a spray tank communicating with said spraying nozzles, agitating means arranged in said tank, means driven by the travel of the machine for actuating said agitating means, a blower communicating with said nozzles and said furnace, and means driven by the travel of said machine for actuating said blower, a clutch disengaging means for said blower, and agitating driving means.

7. In an insect exterminator, a wheeled frame and an insect destroying apparatus comprising a furnace arranged at the forward end of said frame, annular troughs arranged around the base of said furnace, pivoted chutes extending laterally from the wheeled frame and communicating with the said troughs, means for a vertical adjustment of said chutes, spraying nozzles arranged transversely and at the rear of said frame, a spray tank communicating with said spraying nozzles, agitating means arranged in said tank, means driven by the travel of the machine for actuating said agitating means, a blower communicating with said nozzles and said furnace, means driven by the travel of said machine for actuating said blower, a clutch disengaging means for said blower, a vertically arranged baffle screen arranged at the rear of said furnace, and a light back of said baffle screen for attracting the insects to the screen.

In testimony whereof I affix my signature.

DAVID HENRY HUNTER.